(12) United States Patent
Chanda et al.

(10) Patent No.: US 11,061,286 B2
(45) Date of Patent: Jul. 13, 2021

(54) LIQUID CRYSTAL TUNABLE PLASMONIC COLOR GENERATION DEVICE, METHOD AND APPLICATIONS

(71) Applicant: UNIVERSITY OF CENTRAL FLORIDA RESEARCH FOUNDATION, INC., Orlando, FL (US)

(72) Inventors: Debashis Chanda, Oviedo, FL (US); Daniel Franklin, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 15/520,218

(22) PCT Filed: Oct. 20, 2015

(86) PCT No.: PCT/US2015/056373
§ 371 (c)(1),
(2) Date: Apr. 19, 2017

(87) PCT Pub. No.: WO2016/064813
PCT Pub. Date: Apr. 28, 2016

(65) Prior Publication Data
US 2017/0322457 A1    Nov. 9, 2017

Related U.S. Application Data

(60) Provisional application No. 62/066,985, filed on Oct. 22, 2014.

(51) Int. Cl.
*G02F 1/1337*   (2006.01)
*B82Y 20/00*    (2011.01)
(Continued)

(52) U.S. Cl.
CPC ........ *G02F 1/133723* (2013.01); *B82Y 20/00* (2013.01); *G02F 1/139* (2013.01);
(Continued)

(58) Field of Classification Search
CPC .......... G02F 1/133723; G02F 2203/10; G02F 2202/40; G02F 1/139; G02F 1/19
See application file for complete search history.

(56) References Cited

U.S. PATENT DOCUMENTS

2003/0128317 A1* 7/2003 Ohmuro ............ G02F 1/133371
                                                         349/113
2008/0063808 A1* 3/2008 Stumpe ............... G02F 1/13342
                                                         427/510

(Continued)

OTHER PUBLICATIONS

International Search Report and Written Opinion Form PCT/ISA/220, International Application No. PCT/US2015/056373, p. 1-27, dated February 3, 2016.

(Continued)

*Primary Examiner* — Michael H Caley
*Assistant Examiner* — Mariam Qureshi
(74) *Attorney, Agent, or Firm* — Allen, Dyer, Doppelt + Gilchrist, PA

(57) ABSTRACT

Color derived from metallic nanostructures are often more efficient, more robust to environmental changes, and near impossible to damage or bleach due to overexposure. The embodiments combine these advantages with the millisecond re-configurability of liquid crystals to actively control a reflective color of a metallic nanostructure. Of the current technologies that boast active color tunability, many are pigmentation based (e-ink in e-readers) and/or need seconds to change color (photonic ink, electrochromic materials). Speed is an advantage of the embodiments and is comparable to current liquid crystal displays (~120 Hz). Traditional LC displays use static polymer films (color filters) and white (Continued)

back light to generate color. Being able to actively tune the color from a single metallic nanostructure allows for smaller pixel size, increased resolution, and decreased fabrication cost compared to a conventional RGB color pixel without needing external white light source for extremely low power operations.

18 Claims, 11 Drawing Sheets

(51) Int. Cl.
    *G02F 1/139*     (2006.01)
    *G02F 1/19*     (2019.01)

(52) U.S. Cl.
    CPC .......... *G02F 1/1337* (2013.01); *G02F 1/195* (2013.01); *G02F 2202/40* (2013.01); *G02F 2203/10* (2013.01); *G02F 2203/34* (2013.01)

(56) References Cited

U.S. PATENT DOCUMENTS

2011/0109854 A1\* 5/2011 Tang ................. G02F 1/195
    349/117
2014/0146393 A1\* 5/2014 Baba .................. G02B 5/008
    359/569

OTHER PUBLICATIONS

Dabrowski et al., 2013, "High Birefringence Liquid Cyrstals", Institute of Chemistry, Military University of Technology, Warsaw, Poland, Crystals 2013, vol. 3: pp. 443-482, doi:10.3390/cryst3030443.

De Gennes, P.G., and Prost J., 1993, "The Physics of Liquid Crystals, Second Edition", Clarendon Press, Oxford University Press, 2001, pp. 1-3 and pp. 144-147.

Liberman et al., 2014, "Fast, Electrically Tunable IR Filters for Hyperspectral Imaging", Lincoln Laboratory, Massachusetts Institute of Technology, Abstract. Proc. of SPIE vol. 9070, pp. 90702B-1-90702B-16, DOI:10.1117/12.2057511.

Liu et al., 2012, "Light-Driven Plasmonic Color Filters by Overlaying Photoresponsive Liquid Crystals on Gold Annular Aperture Arrays", Advance Optical Materials vol. 24, No. 23, Jun. 19, 2012, pp. OP131-OP135.

Lo et al., 2006, "Variation of Nematic Liquid Crystal on a Silver Surface", Institute of Physics Publishing, Journal of Optics A: Pure and applied Optics, vol. 8, (2006) pp. 501-506.

Wang, Y., Nov. 6, 1995, "Voltage-Induced Color-Selective Absorption With Surface Plasmons", Philips Laboratories, Applied Physics Letter No. 67 (19), pp. 2759-2761.

Wolfe et al., 2004, "Nanostructures Replicated by Polymer Molding", Harvard University, Dekker Encyclopedia of Nanoscience and Nanotechnology, DOI: 10.1081/E-ENN 120009219, pp. 2657-2667.

Yeh, P. and Gu, C., 1999, "Optics of Liquid Crystal Displays", A Wiley Interscience Publication, John Wiley & Sons, Inc., pp. 1-12.

Zhang et al., Nov. 10, 2010, "Controlling the Colour of Metals: Intaglio and Bas-Relief Metamaterials", Optoelectronics Research Center & Center for Photonic Metamaterials, University of South Hampton, Rutherford Appleton Laboratory, Harwell Science nad Innovation Campus, Physics Otopics vol. 1., arXiv:1011-1977, pp. 1-3.

Chu, K.C., et al., Electrically controlled surface plasmon resonance frequency of gold nanorods, Applied Physics Letters, 89, pp. 103107-103107-3 (2006).

Kossyrev, Pavel A., et al., Electric Field Tuning of Plasmonic Response of Nanodot Array in Liquid Crystal Matrix, Nano Letters vol. 5, No. 10, pp. 1978-1981 (2005).

\* cited by examiner

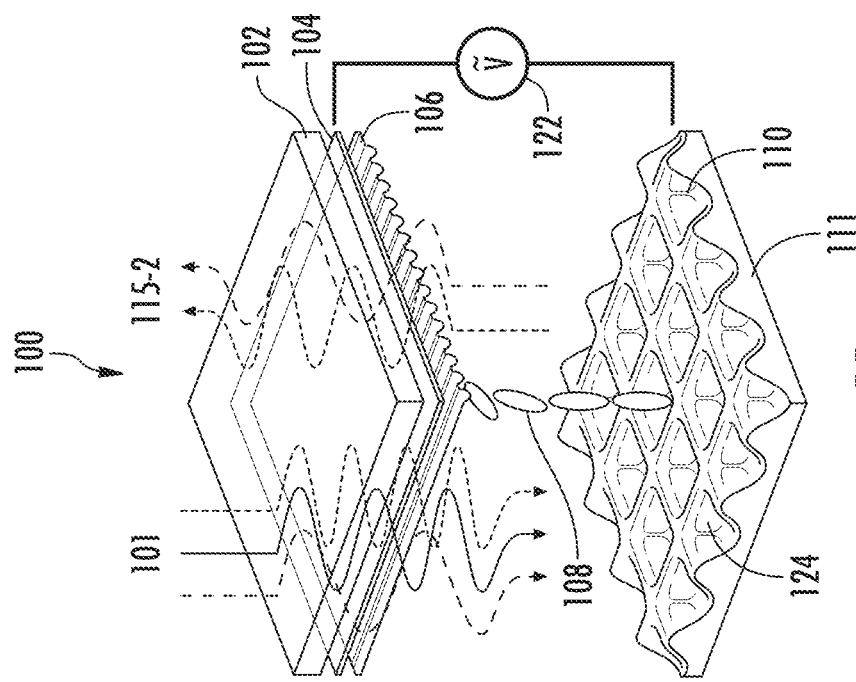
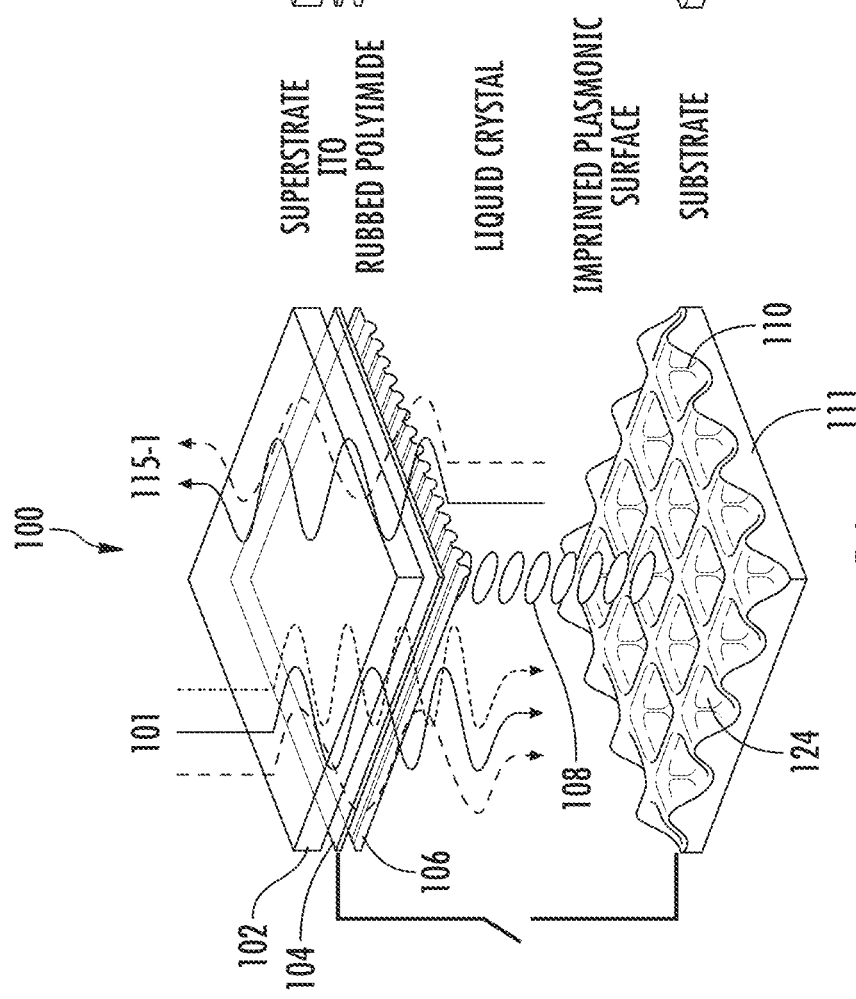
FIG. 1B
FIG. 1A

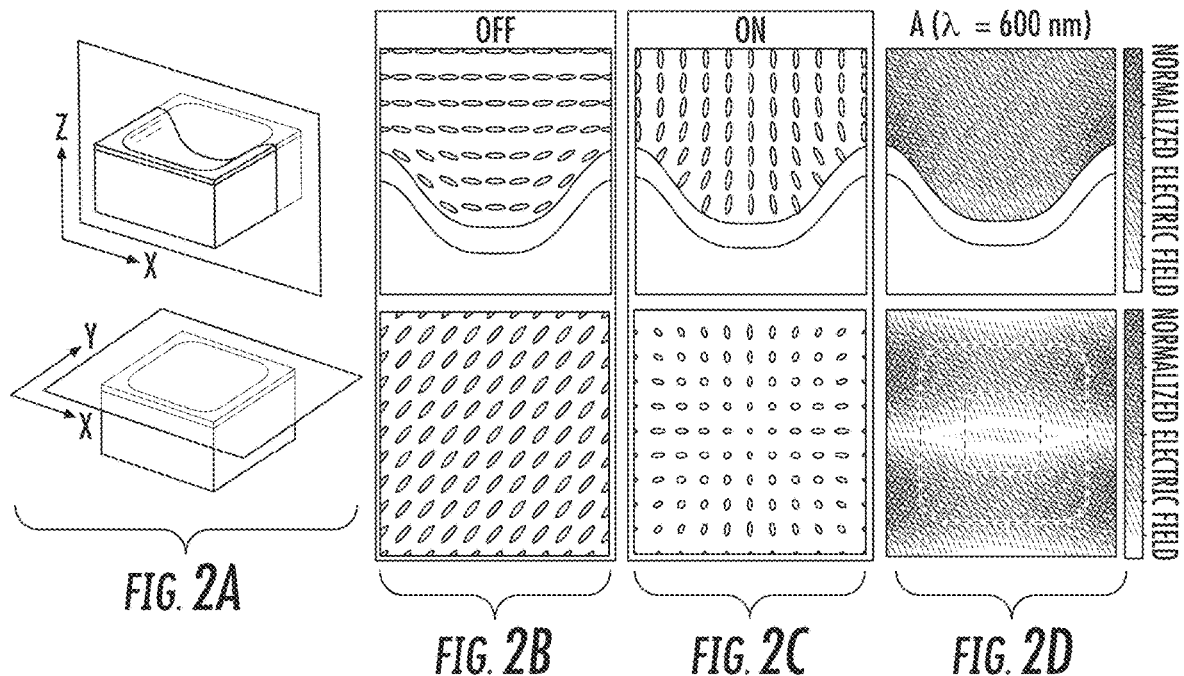
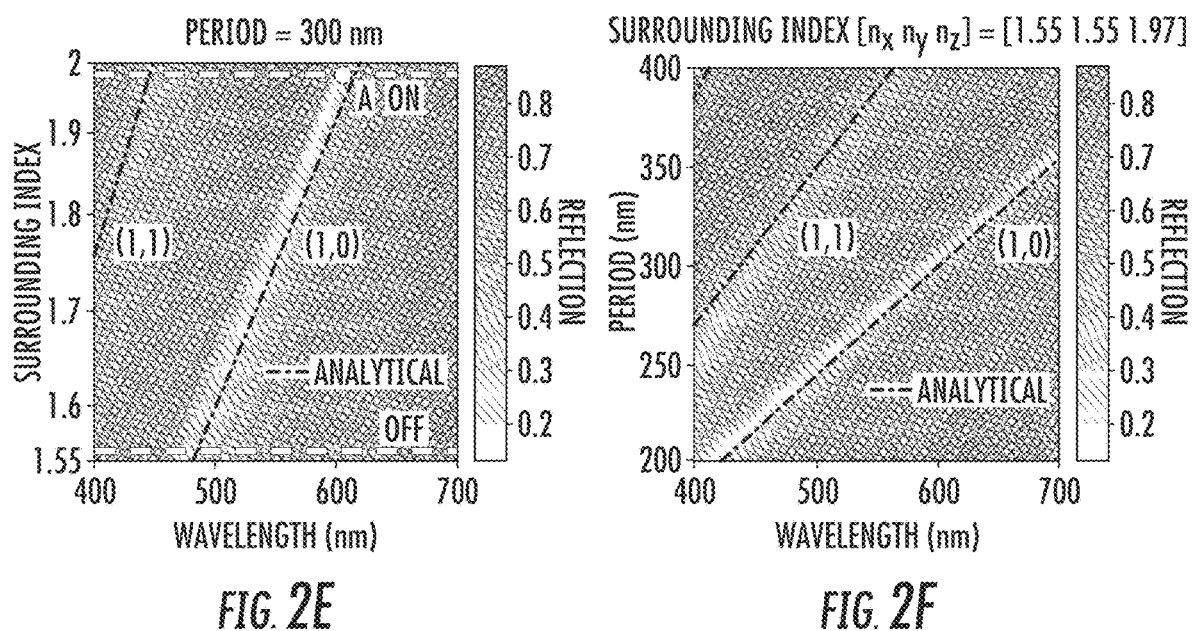

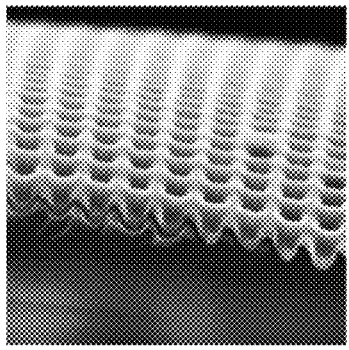
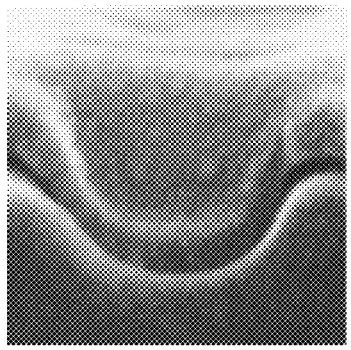
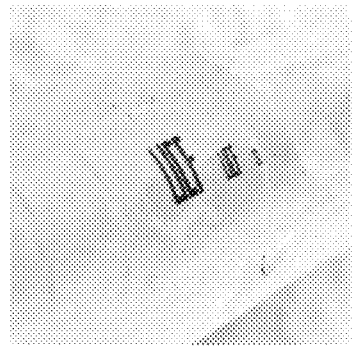
FIG. 3A  FIG. 3B  FIG. 3C
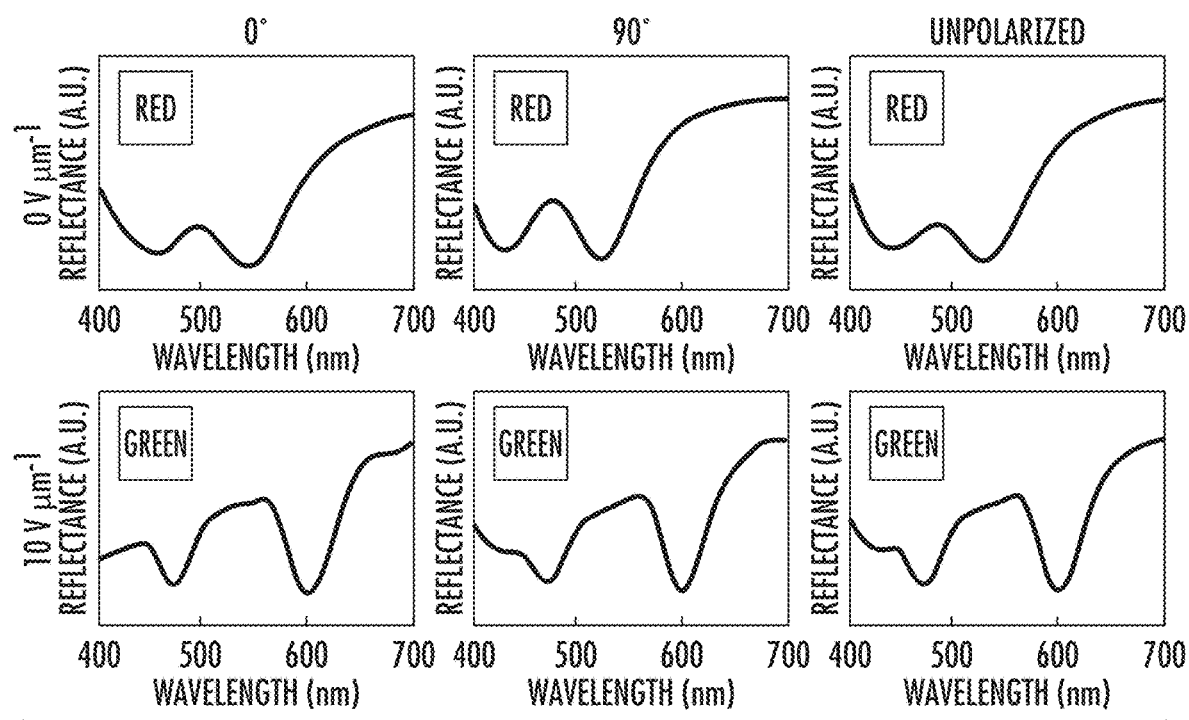
FIG. 3D

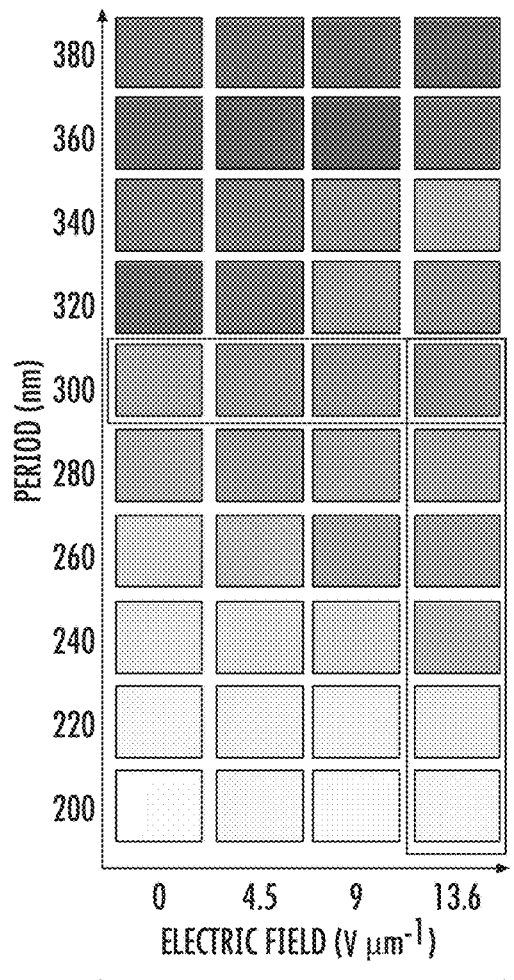
FIG. 4A
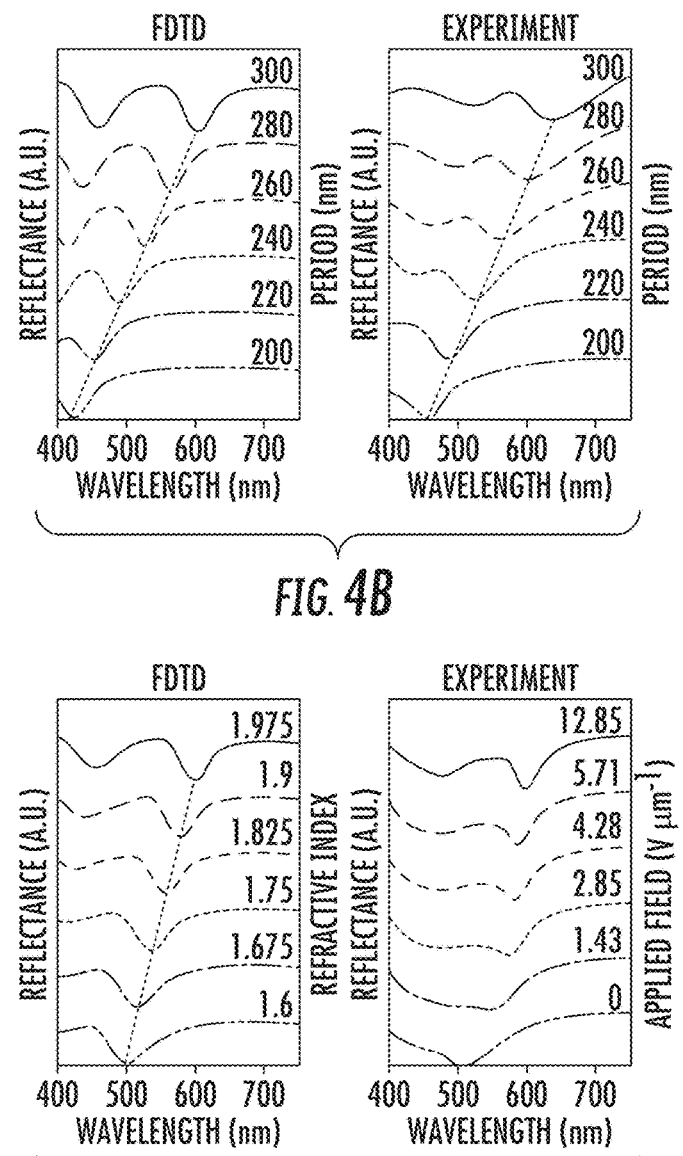
FIG. 4B
FIG. 4C

LCM-1107 ELASTIC, ELECTRO-OPTIC, AND THERMAL PROPERTIES

AT 25°C, 1 kHz:

| $V_{th}$ [$V_{rms}$] | 1.6 |
|---|---|
| $\varepsilon_{\parallel}$ | 19.8 |
| $\varepsilon_{\perp}$ | 4.2 |
| $\Delta\varepsilon$ | 15.6 |
| $K_{11}$ [pN] | 21 |
| $K_{33}$ [pN] | 32 |
| $K_{33}/K_{11}$ | 1.5 |

AT 25°C, 633 nm:

| $\Delta n$ | 0.38 |
|---|---|
| $g_1/K_{11}$ [ms mm$^{-2}$] | 10.5 |
| FoM [mm$^2$ s$^{-1}$] | 13.8 |

PHASE TRANSITION TEMPERATURES:

| CRYSTAL-NEMATIC | -10°C |
|---|---|
| NEMATIC-ISOTROPIC | 100°C |

FIG. 6A

LCM-1107 DISPERSION AT 25°C

| $\lambda$ [nm] | $n_e$ | $n_o$ | $\Delta n$ |
|---|---|---|---|
| 450 | 2.004 | 1.5586 | 0.4417 |
| 486 | 1.9723 | 1.5516 | 0.4207 |
| 546 | 1.9414 | 1.5429 | 0.3985 |
| 589 | 1.9266 | 1.5382 | 0.3884 |
| 633 | 1.9150 | 1.5350 | 0.3800 |
| 656 | 1.9108 | 1.5328 | 0.3780 |

FIG. 6B

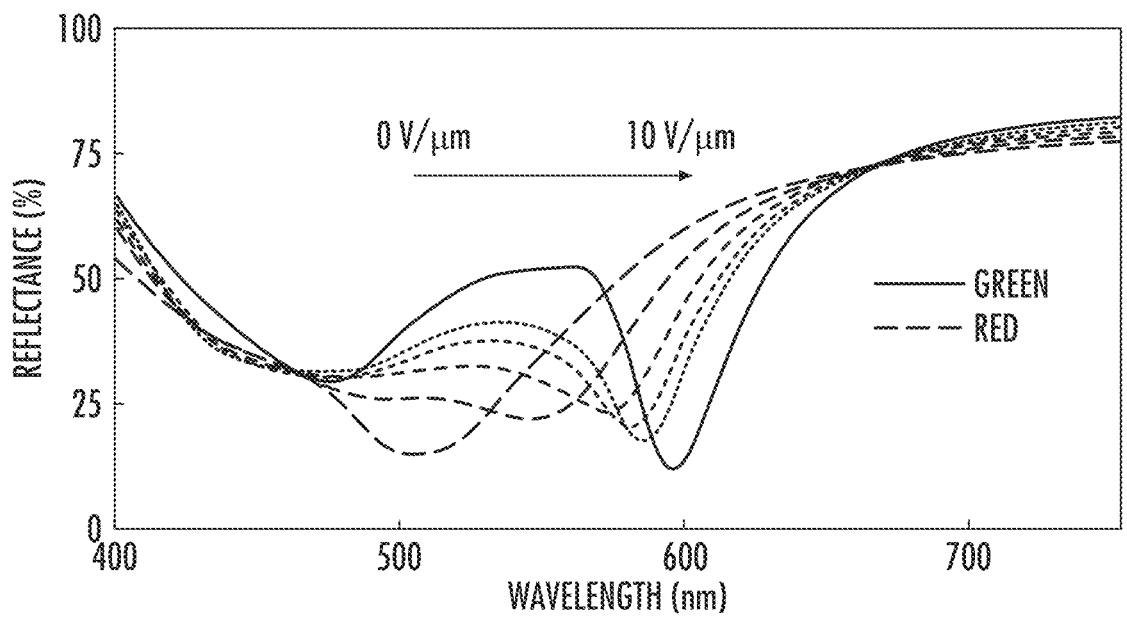
FIG. 7A
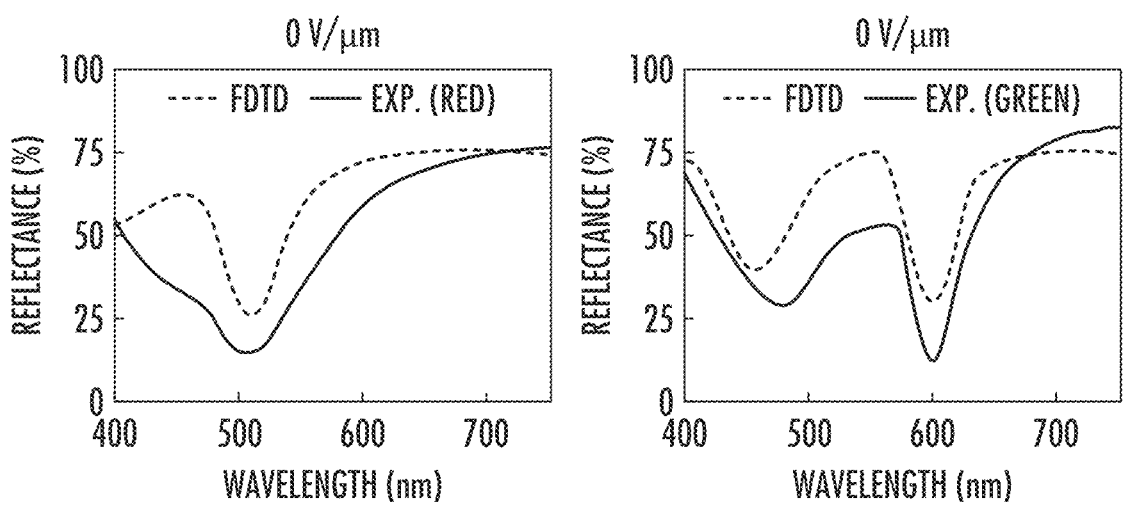
FIG. 7B
FIG. 7C

LIQUID CRYSTAL TUNABLE PLASMONIC COLOR GENERATION DEVICE, METHOD AND APPLICATIONS

RELATED APPLICATION DATA

The instant application claims priority to U.S. provisional application No. 62/066,985 filed on Oct. 22, 2014, the subject matter of which is herein incorporated by reference in its entirety.

FIELD OF THE INVENTION

Aspects and embodiments of the invention are generally in the field of optical physics. More particularly, aspects and embodiments pertain to nanostructured plasmonic-enabled color generation apparatus and methods; and even more particularly, to a tunable color display structure (e.g., a dynamic pixel) and associated methods, and applications thereof.

Plasmonic materials are defined as those utilizing surface plasmons, which exist at metal-dielectric interfaces. Light coupled to these collective electron oscillations is absorbed, leading to subtractive color generation. Structural color arising from nanostructured plasmonic materials offer many benefits over conventional pigmentation-based color filtering for display technologies. Such nanostructures offer increased resolution, efficiency and scalability of their optical response with structure dimensions. However, once these structures are fabricated their optical characteristics typically remain static.

The field of plasmonics has grown over the years due to its unique ability to confine light to subwavelength regions of space. This enhanced confinement has enabled fundamental research on light-matter interactions and, with recent advances in nano fabrication techniques, increased the practical use of plasmonic nanostructures. Many optical applications for these nanostructures have been demonstrated, such as high resolution color filters, polarizers, broad band absorbers and selective reflectors. A key aspect of these devices is the scalability of optical responses with structural dimensions. However, once the respective device is fabricated with a given set of dimensions its optical characteristics remain static, severely restricting its potential applications. Due to this limitation, much effort has been given into making these plasmonic structures dynamic. One technique is to utilize the anisotropy and reconfigurability of liquid crystals (LCs) to change the dielectric constant surrounding the metallic nanostructure, thereby shifting the plasmon resonance spectral location. To date, many of these examples deal with infrared or terahertz frequencies, and those that are in the visible regime remain limited to a small range of color tunability due to the modest shifts (approx. 10-40 nm) in plasmon resonance. While these works show that the phenomenon exists and can be controlled in a variety of ways, they all fall short of the tuning range needed for practical devices.

The inventors have recognized the advantages and benefits of apparatus and methods that address the problems outlined above and others appreciated by those skilled in the art, as well as LC-plasmonic apparatus and methods that enable controllable tuning plasmonic resonances over a range of 95 nm or more to generate a full range of dynamically tunable colors across the entire visible spectrum. It would be further advantageous and beneficial to generate these dynamically tunable colors across the entire visible spectrum on a millisecond time scale, and to be able to generate dynamic color-tunable images. Apparatus and method embodiments of the invention can not only lead to large area, thin-film display elements on rigid and flexible substrates, but can also improve the active tunability of general plasmonic and metamaterial systems.

SUMMARY

In accordance with aspects and embodiments of the invention, liquid crystals (LC) are shown to impart full visible spectrum tunability to nanostructured plasmonic materials by changing the nanostructure's local dielectric constant. Utilizing a continuous plasmonic surface and high birefringent liquid crystal materials, we demonstrate a LC tunable reflective surface where color of a nanostructured surface is changed as a function of applied voltage. The physical phenomenon occurs at an LC-metal nanostructure interface. To facilitate this interface, a cell is made to contain and align (so as not to scatter light) an LC with the ability to realign the LC with an electric field. According to an illustrative embodiment, an LC-plasmonic cell includes a visibly transparent substrate including a rubbed polyimide layer for LC alignment on an indium tin oxide (ITO) coated glass, forming a (top electrode), and a vertically aligned bottom electrode including a substrate and a metallic nanostructure, for color generation, with the LC there between.

The embodiments enable continuous tuning of plasmonic resonance over 95 nm or more, for liquid crystal birefringence differences equal to or greater than 0.45. In combination with underlying nanostructures of varying periodicity, a full range of visible colors can be achieved, paving the way towards applications that include dynamic pixels for displays and filters.

A resulting advantage of the embodied approach is that the number of subpixels in a display device can be reduced and still generate a full range of visible colors. Instead of three color generating filters, RGB or CYM, respectively, two dynamic color pixels could have the same color producing abilities, therefore improving resolution by 33%.

Using liquid crystals to control plasmonic resonances has the added benefit of millisecond-scale response times. While Hi-Bi liquid crystals (i.e., having a birefringence ($\Delta n$) at least about 0.2 and alternatively having a birefringence range from about 0.3 to about 0.5 or more preferably from about 0.4 to about 1.0, tend to have increased viscosities and decreased reorientation times compared to standard liquid crystals, the (unoptimized) embodiments are able to complete a voltage cycle under 90 ms and we believe in the 10-20 ms range or less with optimization. Other systems for active structural color, such as electroactive polymers and electric/magnetic ink, often require seconds to tens of seconds to change colors, rendering them impractical for video displays.

In summary, the embodiments provide an LC-plasmonic system capable of continous color tuning over substantially the entire visible color spectrum. Using Hi-Bi LC's with a continuous aluminum 2D grating, the grating-assisted surface plasmon resonances can be tuned over 100 nm. By varying the period of these gratings, a full range of visible colors can be generated. This represents the largest plasmonic tuning range through LCs to date, and makes plasmonic structures more attractive candidates for display and filter technologies.

An aspect of the invention is an optical component that includes a liquid crystal (LC)-plasmonic cell including a bottom electrode and a top electrode configured in a vertical electrode configuration, wherein the bottom electrode comprises a substrate and a periodically-arrayed, nanostructured, metallic, plasmonic material layer disposed on a top surface of the substrate, which further includes a reconfigurable LC having a birefringence, Δn, that is equal to or greater than 0.2, disposed in contact with the bottom electrode, wherein in an OFF-state the LC has a parallel (homogeneous) orientation to the plasmonic surface; and a voltage source coupled to the electrodes, wherein the top electrode is transparent over the visible spectrum and the periodically-arrayed, nanostructured, metallic, plasmonic material layer is a voltage-tunable-color surface that is optically reflective over the visible, further wherein the LC-plasmonic cell can reflect color across the visible spectrum. In various non-limiting embodiments, the optical component may further include one or more of the following features, limitations, or characteristics alone or in various combinations:

wherein the top electrode comprises at least one of indium tin oxide (ITO, silver nano wires, carbon nanotubes, PEDOT:PSS, a transparent conducting oxide, and a transparent conducting polymer;

wherein the reconfigurable LC is a positive dielectric anisotropy nematic LC;

wherein the periodically-arrayed, nanostructured, metallic plasmonic material layer comprises a conductor material characterized by a plasmon resonance over the visible spectrum that does not promote homeotropic alignment within the OFF-state-aligned liquid crystal; wherein the conductor material is aluminum;

wherein the periodically-arrayed, nanostructured, metallic, plasmonic material layer has an x-direction nanostructure in a range from about 100 to about 500 nanometers, a y-direction nanostructure in a range from about 100 to about 500 nanometers, and a z-direction (depth) nanostructure in a range from about 50 to about 200 nanometers;

wherein $0.2 \leq \Delta n \leq 1.00$;

wherein the periodically-arrayed, nanostructured, metallic plasmonic material layer is characterized by a resonance shift over greater than 95 nm;

wherein the voltage-tunable-color surface has a color-tuning rate less than one (1) second;

wherein the voltage-tunable-color surface has a color-tuning rate less than 90 ms;

characterized in the optical component is polarization-independent;

further comprising a rubbed polyimide LC-alignment layer disposed immediately adjacent a bottom surface of the top electrode.

An aspect of the invention is a method for fabricating an optical component, which includes the steps of forming over a substrate a periodically-arrayed, nanostructured bottom layer; disposing in contact with the periodically-arrayed, nanostructured bottom material layer a homogeneously aligned liquid crystal material layer having a birefringence, Δn, that is equal to or greater than 0.2; and disposing an optically transparent top electrode over the liquid crystal material layer. In various non-limiting embodiments, the method may further include one or more of the following features, steps, limitations, or characteristics alone or in various combinations:

further comprising metallizing the periodically-arrayed, nanostructured, material layer to form a bottom electrode in a vertical electrode configuration with respect to the top electrode;

further comprising forming an aluminum periodically-arrayed, nanostructured bottom electrode material layer;

further comprising casting a polymer mold from the periodically-arrayed, nanostructured bottom material layer;

further comprising providing a thin film; and imprinting the thin film with the polymer mold;

further comprising providing one of an ITO-coated, rigid, glass and an ITO-coated, flexible, PET substrate for the imprinted thin film;

further comprising providing an ITO-coated glass substrate as the transparent top electrode and further providing a rubbed polyimide liquid crystal alignment material layer adjacent the top electrode.

An aspect of the invention is an optical color generation method that includes the steps of providing an optical component comprising a liquid crystal (LC)-plasmonic cell including a bottom electrode and a top electrode configured in a vertical electrode configuration, wherein the bottom electrode comprises a substrate and a periodically-arrayed, nanostructured, metallic, plasmonic material layer disposed on a top surface of the substrate, further comprising a reconfigurable LC having a birefringence, Δn, that is equal to or greater than 0.2, disposed in contact with the bottom electrode, wherein in an OFF-state the LC has a parallel (homogeneous) orientation to the plasmonic surface; and a voltage source coupled to the electrodes, wherein the top electrode is transparent over the visible spectrum and the periodically-arrayed, nanostructured, metallic, plasmonic material layer is a voltage-tunable-color surface that is optically reflective over the visible, further wherein the LC-plasmonic cell can reflect color across the visible spectrum; and varying a voltage from the voltage source to selectively change a plasmonic resonance of the periodically-arrayed, nanostructured, metallic, plasmonic material layer, wherein a particular color from the spectrum of visible light is reflected from the periodically-arrayed, nanostructured, metallic, plasmonic material layer and out through the LC-plasmonic cell.

BRIEF DESCRIPTION OF THE DRAWINGS

FIG. 1a schematically illustrates a plasmonic-liquid crystal cell with impinging white light. Light transmits through the superstrate and liquid crystal layers to interact with the reflective plasmonic surface. The surface selectively absorbs light while reflecting the rest back out of the device. The wavelength of this absorption depends on the liquid crystal orientation near the interface which in turn depends on the electric field applied across the cell; FIG. 1b illustrates how an applied electric field across the cell reorients the liquid crystal and changes the wavelengths of absorbed light, according to exemplary embodiments of the invention.

FIGS. 2a-f illustrate liquid crystal orientation states and plasmonic modes. FIG. 2a shows schematic top and cross-sectional views of the nanostructure unit cell. The green (z-x) and orange (x-y) planes represent x-z and x-y cross-sections, respectively; FIGS. 2b and 2c show FEM-computed liquid crystal orientation on a 300 nm period nanostructure: (b) without an applied electric field (OFF-state) and (c) with a field of 10 V μm$^{-1}$ (ON-state); FIG. 2d shows FDTD-computed electric field intensity ($|E|^2$) spatial cross-section of the first order plasmonic resonance at λ=600 nm, showing penetration of the fields into the liquid crystal region. The 300 nm period structure is excited with y-polarized light; FIG. 2e shows a FDTD-predicted reflectance spectrum as a function of surrounding index for a structure of period 300 nm. White dashed lines indicate the effective surrounding index for the OFF and ON states, respectively.

Black dashed lines show the analytical dispersion relation for grating-coupled surface plasmon modes; FIG. 2f shows a FDTD predicted reflectance spectrum as a function of structure periodicity for the anisotropic effective index given by the ON liquid crystal orientation state, $[n_x \, n_y \, n_z]$=[1.55 1.55 1.97]. Black dashed lines show excellent agreement with the analytical dispersion relation.

FIG. 3a is a SEM image of the structure with period 300 nm before fabrication into liquid crystal cell; FIG. 3b is a close-up of the nanowell unit cell. Scale bars: (a) 500 nm, (b) 100 nm; FIG. 3c is an optical image of macroscopically patterned 'UCF' on a flexible PET substrate; FIG. 3d (six panes) show reflection spectra of a 320 nm period metasurface for various polarization and voltage states. The polarization states are defined as the angle between the x-direction grating vector and the optical axis of the polarizer. Insets are microscope images depicting the reflected color. Line colors are determined by the CIE color-matching functions for the respective spectra.

FIG. 4a shows a palette of obtainable colors for structures of period between 200 and 380 nm as a function of applied voltage; FIG. 4b shows simulated (left panel) and experimental (right panel) reflectance spectra of the selected surfaces as a function of period with the ON state anisotropic effective index $[n_x \, n_y \, n_z]$=[1.55 1.55 1.97] and 13.6 V $\mu m^{-1}$ applied electric field, respectively. Dashed black trend lines show the linear relationship between plasmonic absorption and periodicity; FIG. 4c shows simulated (left panel) and experimental (right panel reflectance spectra of the surface with period 300 nm as a function of surrounding index and applied electric field, respectively.

FIG. 6a lists the Elastic, Electro-Optic, and Thermal properties of an exemplary liquid crystal, LCM1107; FIG. 6b lists the dispersion values of LCM1107.

FIG. 7a shows FTIR reflection spectra of a period 300 nm metasurface as a function of voltage. Line color is found from the CIE color matching functions. Fabry-Perot oscillations have been smoothed to more easily convey plasmonic absorption. FIGS. 7b and 7c compare the FDTD predicted response to experiment for the 0 V $\mu m^{-1}$ and 10 V $\mu m^{-1}$ cases, respectively. These figures show the absolute reflection (or efficiency) of the LC-plasmonic system.

FIG. 11 illustrates color mapping to arbitrary images.

FIG. 13 shows FDTD simulations for a structure of period 300 nm and 100 nm relief depth.

FIG. 14 illustrates response time measurements. Using a 633 nm He—Ne laser and photodiode, measurements of the response time can be made from 0 V/$\mu m$ to 10 V/$\mu m$ of the Afghan Girl in FIGS. 5(a-d). FIG. 14a shows the rise time (when voltage is applied), while

Figures 5A, 5B, 5C, 5D:
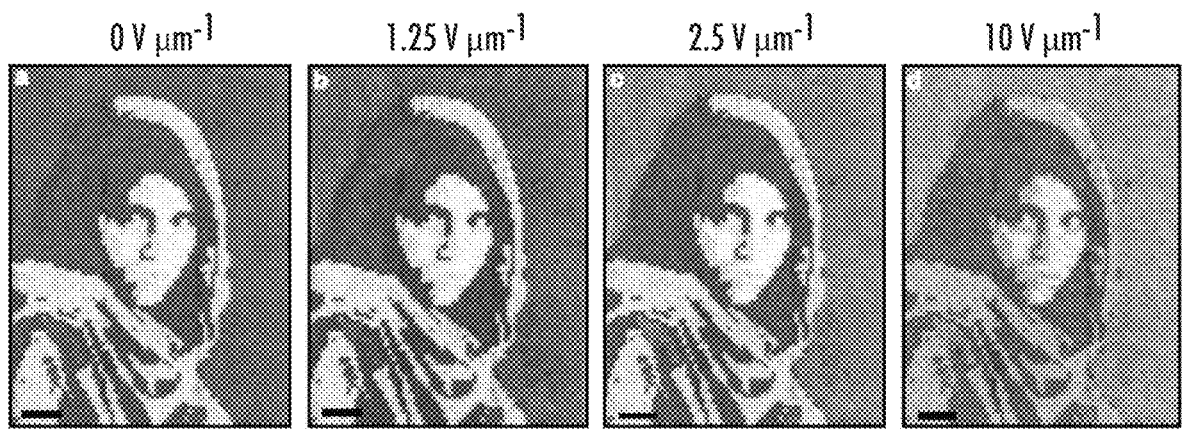
FIGS. 5a, 5b, 5c, and 5d, respectively, are microscope images of a singular Afghan Girl image as a function of applied electric field. Nanostructure periods are chosen so colors match the original photograph at color tuning saturation, 10 V $\mu m^{-1}$. Scale bars (a-d): 100 mm. Defects due to fabrication errors (missing pixels) have been replaced by nearest neighbours.

All of the figures are representative of exemplary, illustrative, and/or demonstrative aspects and embodiments of the invention.

DETAILED DESCRIPTION OF THE NON-LIMITING EMBODIMENTS

FIGS. 1a and 1b illustrate a basic LC-plasmonic coupled system 100. The system includes a top glass superstrate 102 upon which is located and formed an ITO material layer 104 in turn upon which is located and formed a rubbed polyimide LC-alignment layer 106. Each of the foregoing three component layers may include materials, and be formed using methods, as are otherwise generally conventional or unconventional in the art. For example, the glass top superstrate 102 and the corresponding glass bottom substrate 111 are otherwise generally conventional and appropriately optically transparent. Alternative substrate materials, including but not limited to flexible substrate materials, may also be suitable. The ITO material layer 104 may have a thickness of about 20 nanometers generally, but may have a thickness ranging from about 20 to about 100 nanometers. Similarly, the rubbed polyimide LC-alignment layer 106 may have a thickness from about 50 to about 100 nanometers, using a polyimide material that has a molecular weight from about 50,000 to about 150,000 amu. The polyimide alignment layer is rubbed diagonally with respect to the grating vector of the plasmonic nanostructure described below. The top glass superstrate and the ITO material layer form and function as a top electrode of the system.

A vertically-aligned bottom electrode of the system includes the glass substrate 111 upon which is disposed a nanostructured polymer material layer 124 coated with a continuous layer of aluminum forming a nanostructured plasmonic metasurface layer 110. Other reflective material layers may also be used. For an operative embodiment a nanostructure within a nanostructured electrode material layer advantageously has a lower plateau to upper plateau step height from about 50 to about 200 nanometers, and more particularly from about 75 to about 125 nanometers. Such a nanostructured material layer also has an upper plateau line width from about 50 to about 250 nanometers, and more particularly from about 100 to about 200 nanometers. Such a nanostructured material layer also has a lower plateau space width from about 50 to about 250 nanometers, and more particularly from about 100 to about 200 nanometers. Generally, the nanostructured plasmonic metasurface has an in-plane x dimension nanostructure from about 100 about 500 nanometers, a perpendicular in-plane y-dimension nanostructure from about 100 to about 500 nanometers, and a perpendicular to plane z-dimension nanostructure from about 50 to about 200 nanometers.

A high birefringence (Hi-Bi) LC 108 is placed inside the cell in direct contact with the aluminium surface. Unpolarized white light 101 transmits through the top glass and LC layers and couples to the plasmonic modes of the aluminium surface. The spectral location of these surface plasmon resonances (SPR) is dependent on the surrounding dielectric constant and is determined by the LC's orientation, which in turn, is controlled through the applied electric field between the ITO layer and aluminium surface via voltage source 122. Light that is not absorbed by the metasurface is reflected back out of the LC cell to be perceived as a visible color. FIGS. 1a and 1b, respectively, illustrate a single surface as the LC reorients between its two extrema and the resulting color change output 115-1, 115-2. This method differs greatly from standard LC displays in which color is generated by static polymeric filters and the LC, in conjunction with polarization layers, functions as a light valve.

The liquid crystal material layer 108 has a thickness from about 2 to about 10 micrometers, and birefringence characterized by $\Delta n$ equal to at least about 0.2, alternatively having a birefringence range from about 0.3 to about 0.5, and advantageously from about 0.4 to about 1.0. Such birefringence characteristics may be found within birefringent materials including but not limited to other types of liquid crystals (nematic, smectic, chiral, lyotropic, discotic, and blue phase LC) and other birefringent materials (crystals, stretched polymers, etc.) though some of these may not easily be tunable with an electric field.

To achieve a large plasmonic shift, several design considerations are taken into account. A positive dielectric anisotropy nematic LC is used which, in general, has a larger dipole moment than its negative counterpart. This lowers the electric field required to reorient the LC while also increasing its birefringence. This is important as the shift in plasmonic resonance is proportional to the LC's birefringence. We therefore use a commercially available Hi-Bi LC (LCM1107, LC Matter Corp.) with $n_e$=1.97 and $n_o$=1.55, and a resultant birefringence of 0.42. The vertical electrode configuration allows for the plasmonic surface to serve as an electrode. This also increases the ability of an applied field to reorient the LC near the aluminum surface as compared with the fringe fields generated by an in-plane-switching device. With this electrode configuration and LC polarity, the OFF-state LC orientation must be parallel (homogeneous) to the plasmonic surface to allow reorientation with an applied field. This places several constraints on the nanostructure dimensions and constituent materials. It has been shown that the orientation of LC on a nanostructured surface is highly dependent on the space in which it is confined, that is, if the well depth-to-diameter ratio is too large, the LC aligns vertically (homeotropic alignment) inside the well. For this reason, the nanowells must be shallow to allow the homogeneous alignment of the LC inside. The orientation of the LC near the surface is also material dependent. Various low loss plasmonic metals, such as silver, exhibit homeotropic alignment due to their surface energy, ultimately inhibiting tunability. While gold has been used extensively in LC tunable plasmonics, its intrinsic intraband absorption in the visible spectral domain makes it unsuitable for full visible color generation. For these reasons, aluminum is advantageously used as the tunable plasmonic surface as it has been shown to impart degenerate planar alignment without intrinsic visible domain absorption. Degenerate anchoring implies that the LCs do not have a preferred alignment direction within the plane of the surface.

The LC orientation within and near the nanostructured surface is vital in defining the spectral location of the plasmonic modes and ultimately their potential for being tuned. To understand the structure's topographical influence on the LC, FEM calculations on a unit cell of the surface were performed. The numerical simulation used a Q-tensor method to minimize the Landau-de Gennes-free energy functional for a given set of boundary conditions, LC parameters and external applied fields. The LC will take the orientation that minimizes this internal energy, the unit cell and results of which can be seen in FIGS. 2a-c. The LC depicted in FIGS. 2b-c represents the average local LC orientation about a uniformly sampled grid. The LC is not drawn to scale as typical molecules are ≈2 nm long while the structure period is 300 nm. The simulations use periodic boundary conditions to imitate an infinite array of nanowells and use experimentally verified LC elastic coefficients (see FIG. 6). Degenerate anchoring is applied for the aluminum surface, while the top surface anchoring energy is set to zero. The purpose of this is to isolate the aluminum surface's alignment properties from that of the top polyimide alignment layer. Without an external bias, the LC conforms to the profile of the aluminum surface and aligns diagonally with respect to the unit cell as can be seen in the FEM prediction of FIG. 2b. With the application of voltage, a Freedericksz transition is observed where the LC molecules start to reorient from their initial OFF-state. Further increase in voltage continuously rotates the LCs vertically until they align along the electric field as shown in FEM prediction, FIG. 2c. This transition followed by a continuous tuning can be seen FIG. 7, where the experimental reflection spectra of a structured surface is tuned as a function of voltage. These orientation matrices along with the $n_e$ and $n_o$ values of the LC produce an anisotropic index tensor, which can be used to predict properties of the surface's optical behavior. Interestingly, the orientation states, and therefore index tensors, have symmetries which suggest polarization-independent behavior from light polarized along the structure's orthogonal periodicity vectors. This is a useful property for reflective display elements illuminated with ambient white light as polarizers are not needed, reducing fabrication costs and increasing reflection efficiency. Lastly, it is notable that the actual LC orientation within a device will also depend on the top alignment layer and the spacing between them. To maintain the system's polarization independence, the LC orientations in FIGS. 2b, c must be preserved. For the present case, a relatively large cell gap of ≈4 μm (defined by the order coherence length of the specific LC) is used to reduce the effect of the top-rubbed-polyimide alignment layer on the anchoring of the aluminum surface. Polarization-dependent reflection is observed for cell gaps at ≤2 μm due to the strong influence of the top alignment layer. Cell gap measurements are obtained by fitting FTIR reflection spectra to a Fabry-Perot analytical model.

It is noted that a shallower relief depth of the periodic metasurface (in the range of about 70-80 nm) and an increased surface roughness, will contribute to polarization-dependent operation, compared to the relief depth of about 100 nm and smoothness (as a result of deposition conditions) of the periodic metasurface for polarization-independent operation.

Once the LC orientation states are found, their effect on the plasmonic surface can be determined. FIG. 2d shows the FDTD-predicted cross-sectional and top view electric field distributions for the first order resonant wavelength at 600 nm. The structure is excited from above at normal incidence with y-polarized light and has a period of 300 nm, a 100 nm nanowell depth and a 30 nm thick aluminum layer. The evanescent plasmonic fields penetrate tens of nanometers into the surrounding material and define the region sensitive to LC reorientation. The refractive index component normal to the metallic surface within these regions changes dramatically between the two LC orientation states, due to near 90° LC rotation, allowing the maximum theoretical shift in plasmon resonance for the given LC and nanostructured plasmonic surface. Furthermore, the continuous metallic surface forces these fields into the LC region, maximizing the overlap between plasmonic fields and LC. This results in an increased tuning capability compared with discontinuous plasmonic systems, where fields can be partially confined in untunable dielectric regions inaccessible to the LC. As discussed above, regions most sensitive to LC reorientation are those with high plasmonic fields.

To elucidate the plasmonic modes of the surface, we averaged the LC orientations in FIGS. 2b, c within the plasmonic fields (1/e) of FIG. 2d to obtain anisotropic effective index values for the OFF ([$n_x$ $n_y$ $n_z$]=[1.72 1.72 1.56]) and ON ([$n_x$ $n_y$ $n_z$]=[1.55 1.55 1.97]) device states. FIG. 2e shows the reflection spectrum for normal angle of incidence as a function of the effective refractive index taken between these anisotropic index states. A linear shift in SPR is observed with the increase in the effective refractive index, resulting in a continuous variation of color. The dashed black lines indicate grating-coupled propagating surface plasmon (GCSP) modes defined by the analytical equation, $$2\pi/\lambda=[p/(i^2+j^2)^{1/2}][(\varepsilon_{Al}\varepsilon_{LC})/(\varepsilon_{Al}+\varepsilon_{LC})]^{1/2},$$

where P is the period of the grating, i and j are mode orders, and $\varepsilon_{Al}$ and $E_{LC}$ are the permittivity for aluminum and surrounding LC, respectively. This dispersion relation sets a limit on the maximum active shift obtainable for a given LC-GCSP system and is proportional to the LC's birefringence, $n_e$-$n_o$. The Hi-Bi LC used herein has a $n_e$ and $n_o$ of 1.97 and 1.55, respectively, giving a maximum first order resonance shift of 110 nm from the GCSP analytical expression. This assumes complete LC reorientation and overlap between the LC index change and plasmonic mode profile.

Dashed white lines in FIG. 2e indicate the two effective index extrema predicted by the LC orientation states in FIGS. 2b, c. As per the grating-coupled SPR equation mentioned above, similar tuning of SPR can be accomplished by changing the period of the nanostructure. FIG. 2f shows the FDTD-predicted far-field reflection from the surface as a function of period for the ON-state surrounding anisotropic index of [$n_x$ $n_y$ $n_z$]=[1.55 1.55 1.97]. Dashed black lines show excellent agreement between FDTD predictions and the analytical GCSP dispersion relation in both FIGS. 2e and 2f. Diffraction may be a concern when using periodic structures. For the grating period of 300-380 nm, diffraction occurs below 460-590 nm wavelength range but with low efficiency due to the shallowness of the nanostructure. Furthermore, the weakly diffracted light below this cutoff wavelength range diffracts at angles greater than the total internal reflection angle of the top glass-air interface, effectively trapping them within the LC cell.

FIGS. 3a, 3b show scanning electron microscope (SEM) images of the structured aluminum surface (i.e. the conductor material defining a two-dimensional mesh pattern with a plurality of openings therein) before LC cell assembly. A simple nanoimprinting technique is employed to pattern a polymer film (SU-8) followed by a blanket deposition of ≈30 nm aluminum using an electron beam evaporator. The master patterns are fabricated through direct laser writing (DLW). One such DLW master can produce hundreds of polymeric imprinting stamps, and one such stamp can produce thousands of imprints without any noticeable pattern degradation. The process is compatible with rigid as well as flexible substrates as can be seen in FIG. 3c, where a macroscopically patterned 'UCF' LC-plasmonic surface is formed on a conformal plastic (polyethylene terephthalate (PET)) surface.

To determine the polarization dependence of the LC-plasmonic system, microscope images and reflectance spectra are shown in FIG. 3d for a nanostructured surface of 320 nm period. Polarized states are defined by the angle between the x-direction grating vector of the surface and the optical axis of the polarizer. Insets are microscope images showing the reflected color while line colors are determined by the International Commission on Illumination (CIE) color-matching functions for the respective reflection spectra. While slight variations in spectra are observed, they are too minor to drastically affect the perceived color. This shows that the system is largely polarization independent, a finding consistent with LC orientation simulations.

Figure 9:
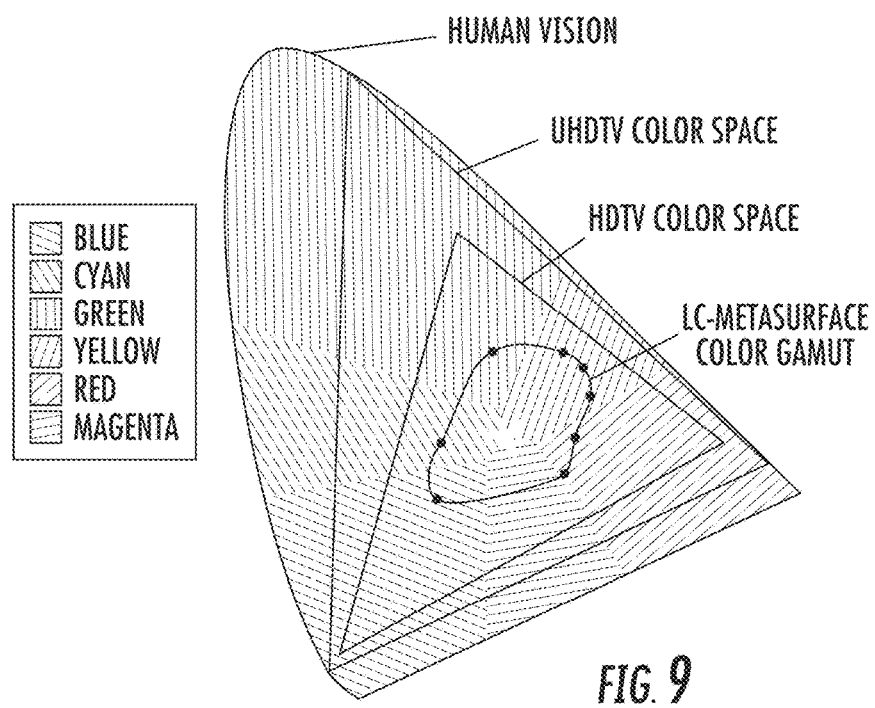
FIG. 9 shows a CIE Chromaticity Diagram. The dotted line is obtained from the outermost colors of the color swath of FIG. 4d, mapped with the color matching functions to the CIE chromaticity diagram. The HDTV color space is defined by the ITU-R BT.709 standard, while UHDTV color space is defined by the ITU-R BT.2020 standard.
Figure 10:
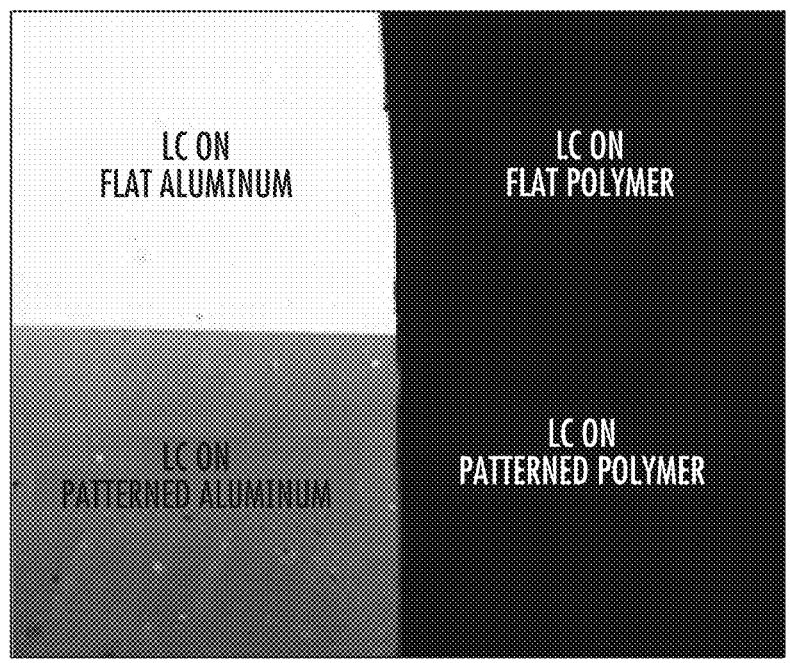
FIG. 10 reinforces the origin of the reflected color, which shows an optical micrograph containing four distinct regions, all of which contain LC. The first, showing flat aluminum, reflects all light. The second contains flat polymer without aluminum and is dark due to negligible reflection. The third consists of patterned polymer without aluminum, which is also dark. The fourth, containing nanostructured aluminum, reflects a given color. Together, these regions show that structure, aluminum, and LC are not individually responsible for color generation, and only through the combination of all three, does color result.

The full range of colors obtainable with the LC-plasmonic system as a function of nanostructure period and applied electric field can be seen in FIG. 4a. Having the first (1,0) and second (1,1) order grating-coupled SPRs within the optical spectrum allows a full range of colors (that is, red, green and blue (RGB) and cyan, yellow and magenta (CYM)) as compared with single resonance subtractive color, which is limited to the CYM color space. This is further supported by the full circle of points about the central white point in the CIE chromaticity diagram depicted in FIG. 9. We emphasize that LC on planer aluminum or nanostructured polymer does not generate color and only with the combination of these two components does color result (see FIG. 10). FIGS. 4b, c show experimental and theoretical reflection spectra corresponding to the structural colors outlined in FIG. 4a. Due to a ≈±20 nm deviation in structural periodicity during DLW, the FDTD reflection spectra of FIGS. 4b, c are Gaussian-weighted averages about the indicated period. We used Gaussian-weighted averaging as larger deviations from the ideal period are less probable.

The CIE color-matching functions are used to obtain the line color for each plotted spectra.

A close linear relationship between structure period and plasmonic absorption location is observed in FIG. 4b and shown by the dotted line. FIG. 4c shows the FDTD-predicted and experimentally measured reflection spectrum from a single structure of period 300 nm as a function of anisotropic effective surrounding index and applied voltage, respectively. Here we observe a nonlinear relationship between the applied voltage and resonant wavelength. We believe this due to the bulk of the LC within the plasmonic field reorienting with a relatively small applied electric field (0-2 V $\mu m^{-1}$). However, a much greater voltage is required to reorient the LC near the nano structure due to the aluminum surface anchoring forces. The first order experimental resonance shifts of 95 nm are reasonably close to the maximum FDTD and analytically predicted value of 110 nm (compare FIG. 2e with FIG. 4c). Slight deviations between theoretical and experimental observations are believed to originate from fabrication tolerances. While the spectra in FIGS. 4b, c are offset to emphasize the shift in plasmonic resonance, the absolute reflection (or efficiency) has peaks from 50 to 80% over the visible domain, an example of which can be seen in FIG. 7.

Figures 5E, 5F, 5G, 5H:
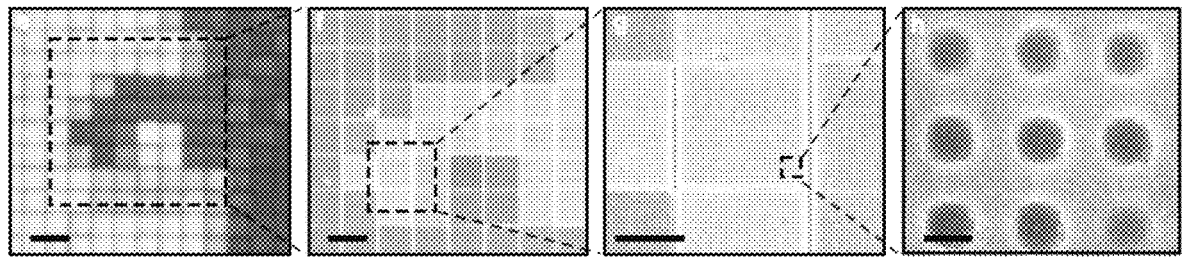
FIG. 5e is a microscope image at 10 V $\mu m^{-1}$ with a ×10 objective showing pixilation of the image.
FIG. 5f, 5g, 5h, respectively, are SEM images of the sample before fabrication into a liquid crystal cell. The series shows the constituent nanostructure of individual pixels. Scale bars: (e) 20 mm, (f) 10 mm, (g) 5 mm, (h) 150 nm. (Copyright Steve McCurry/Magnum Photos. Image rights granted by Magnum Photos New York).
Figure 8A:
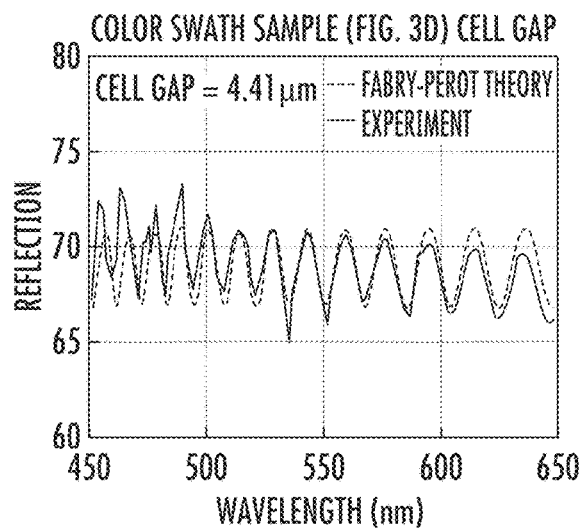
FIG. 8a shows FTIR reflection measurements off-metasurface of a color swath with matching Fabry-Perot theory to determine cell gaps.
Figure 8B:
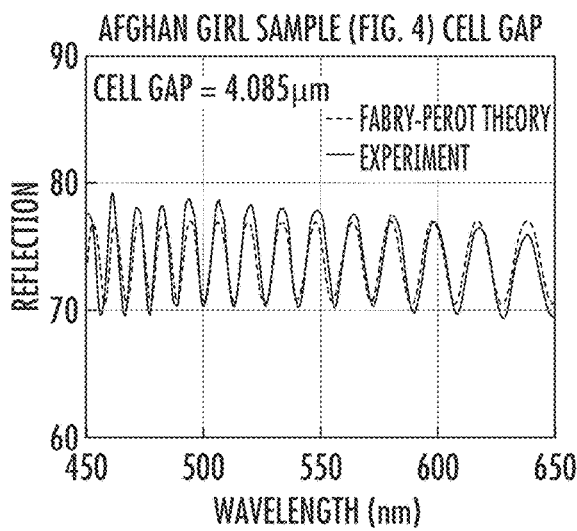
FIG. 8b shows FTIR reflection measurements off-metasurface of the Afgan Girl sample (FIG. 5) with matching Fabry-Perot theory to determine cell gaps. 15 V/$\mu m$ is applied across the cells to guarantee a vertical LC orientation state.
Figures 11A, 11B, 11C, 11D:
FIG. 11a shows an arbitrary image.
FIG. 11b shows the image pixilated to a desired dimension. A database is made of the color swath in FIG. 4d, mapping Lab color space to direct laser writing (DLW) parameters.
in FIG. 11c, the pixilated image in 11b is mapped using a Lab space least distance method to the DLW settings from the database.
FIG. 11d is an optical micrograph of the ON-state (10 V/$\mu m$) display.

To emphasize the display potential of these plasmonic surfaces, the resultant color palette is exploited to form color-tunable images. FIGS. 5a-d show 0.75×1 mm reflective optical images of the Afghan Girl (Magnum Photos), while the singular sample is tuned through 0-10 V $\mu m^{-1}$ of applied electric field. The color mapping process is outlined in FIG. 11. From the Afghan Girl image, it is evident that the color of nanostructured surfaces with different periodicities saturate at different voltages. For example, the background saturates to its final color (green) at 2.5 V $\mu m^{-1}$, where the shawl saturates (to red/pink) at 10 V $\mu m^{-1}$. This can be attributed to the surface anchoring force dependence on topography, which varies with the periodicity of the metasurface. FIG. 5e shows a magnified image of the Afghan Girl using a ×10 objective. The 10×10 $\mu$m pixels can be seen in the SEM subfigures (FIGS. 4f-h) as two-dimensional (2D) gratings of varying periods. In this example, the pixelated plasmonic surface is singularly addressed and therefore limited to display one image. Further addressing of each pixel based on a standard addressing scheme will enable the display of video.

Figure 12:
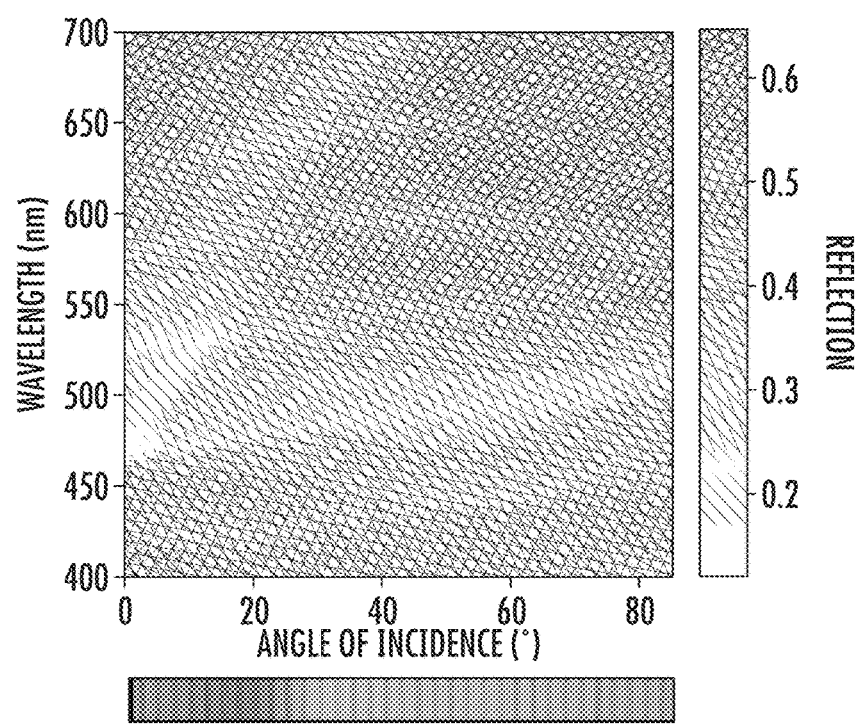
FIG. 12 shows rigorous coupled wave analysis (RCWA) simulation for the reflection of a 300 nm period metasurface as a function of incident angle. Structure is excited with unpolarized white light. We find the color of the structure is invariant up to ~20°, upon which we see a change due to the splitting of the plasmonic mode.

We used a ×4 objective with 0.07 numerical aperture (NA) for the Afghan Girl images in FIGS. 5a-d and a ×10 objective with 0.25 NA for the image in FIG. 5e. These NAs correspond to collection angles of 4° and 15°, respectively, between which we do not see an appreciable difference in color. However, the present structure is angle dependent due to the excitation of GCSPs and rigorous coupled wave analysis has been performed to quantify this. FIG. 12 shows the polarization-averaged angle-dependent reflection of a 300 nm period structure with a color bar showing the CIE-predicted color of the surface for each individual angle. From this we find the color of the structure relatively angle invariant up to ≈20°.

Figure 13A:
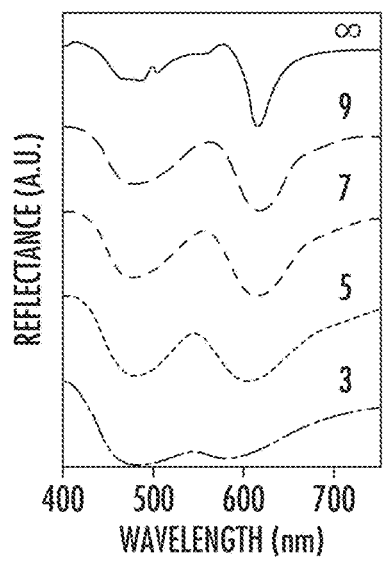
FIG. 13a: FDTD reflection spectra of structures with varying numbers of periods.
Figure 13B:
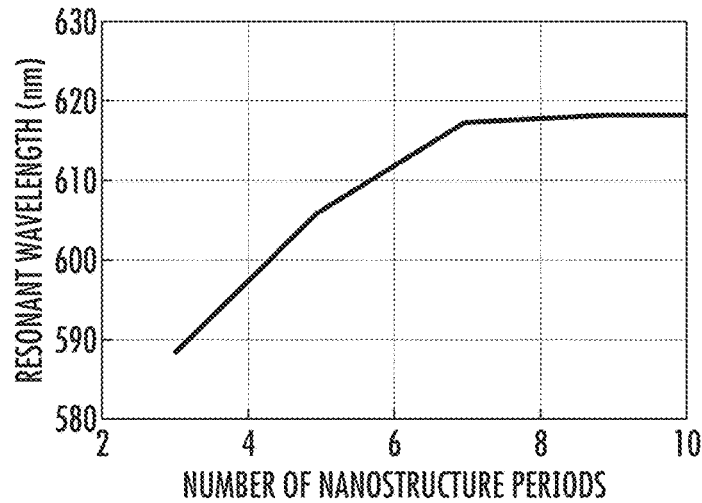
(FIG. 13b: The first order resonant wavelength as a function of surfaces with varying numbers of periods. We find that the resonant wavelength location approaches that of the infinitely periodic structure within 1 nm for 9 structure periods.

It should also be noted that the GCSP resonance relies on multiple periods of the nanostructure. This means a minimum pixel size should exist for a given periodicity, below which one would observe a change in reflected color. FIG. 13 shows the reflection spectrum as a function of the number of nanostructure periods. We find that seven periods are required for the resonant wavelength to approach that of the infinitely periodic case. For the 300 nm period structure simulated, this predicts a minimum pixel size of 2.1 mm. As the pixel size decreases below the surface plasmon propagation length, the reflected color shifts until it begins to wash out due to the weakening of the resonance. Lastly, we note that the grey states are not achievable by the LC-plasmonic surface alone. Even in standard LC displays, the color-generating mechanism is independent of the grey state mechanism. For example, static polymer filters, which generate color, are laminated onto a LC cell, which controls the grey state. Similarly, separate layers of polarization optics would be needed to achieve grey states in the present LC-metasurface device.

Figure 14A:
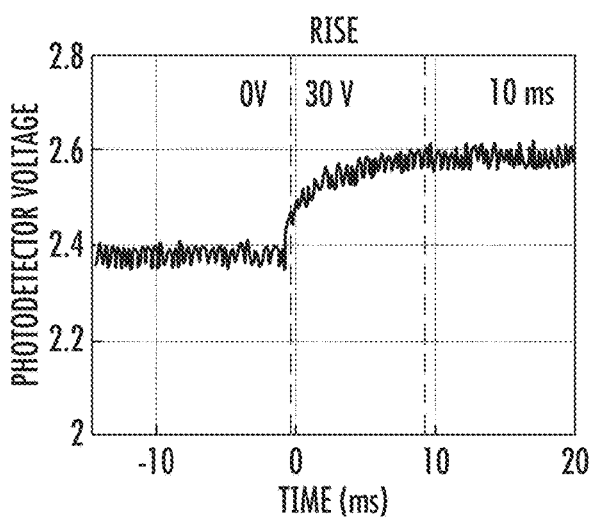
Figure 14B:
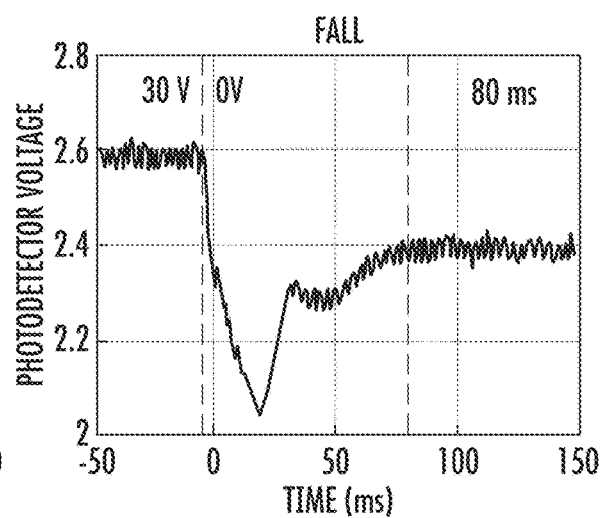
FIG. 14b shows the fall time (when voltage is removed). Together, the measurements indicate a 90 ms cycling time.

LCs offer the added benefit of millisecond-scale response times needed for high temporal resolution video. While Hi-Bi nematic LCs tend to have increased viscosities and decreased reorientation times compared with standard nematic LCs, the system in question can complete voltage cycles under 90 ms without any optimization (see FIG. 14). Other systems for active structural color, such as electroactive polymers and electric/magnetic ink often require seconds to tens of seconds to change colors, severely limiting their use in displays and other electro-optic devices. Another critical advantage of the tunable plasmonic surface is that the number of subpixels in a display device can be reduced, therefore increasing pixel density and resolution. Instead of three color-generating subpixels, RGB or CYM of present displays, two dynamic color pixels can have the same color-producing abilities. It remains a challenge though to span the entire spectrum using a single pixel. We anticipate further improvements in tunability by exploiting different plasmonic coupling mechanisms, polarization dependence, and bistability of LC orientation states.

We have presented a polarization-independent LC-plasmonic system, which shows continuous color tuning over a large range of the color spectrum. Using Hi-Bi LC's with a continuous nanostructured aluminum surface, the grating-coupled SPRs can be tuned over a large range. This range of tunability approaches the maximum theoretically predicted value through an engineered surface, which ensures significant LC reorientation and maximum overlap between the plasmonic fields and LC. By varying the period of the nanostructure, a full range of visible color is achieved. The presented framework makes LC-plasmonic systems more attractive candidates for display, filter, and other actively tunable optical technologies.

Methods

Fabrication of Plasmonic Surfaces.

The plasmonic surfaces are fabricated through DLW using a commercially available femtosecond laser lithography system (NanoScribe GmbH). The Dip-In configuration was used with a ×100, 1.3 NA oil immersion objective (Zeiss) and IP-Dip (NanoScribe GmbH) photoresist. The IP-Dip is drop cast on a fused silica substrate and the objective immersed directly in the photoresist. After writing, samples were developed in propylene glycol monomethyl ether acetate (Sigma-Aldrich) for 20 min, rinsed in isopropyl alcohol and dried over a hot plate. The structures are sinusoidal in nature due to the ≈50-100 nm ovular voxel resolution limitations of the DLW system. The patterned polymeric substrates are then either taken to the next step of metallization or used as a master for nanoimprint lithography for rapid replication. If used for nanoimprint lithography, a polymer (dimethylsiloxane) (Dow Corning, Sylgard) mold is cast from the sample. A thin film of SU-8 2000.5 (MicroChem) was spun (500 r.p.m. for 5 s followed by 3,000 r.p.m. for 30 s) then prebaked at 95° C. for 1 min. This film is imprinted with the polymer (dimethylsiloxane) mold and then ultraviolet cured (1 min) and post-exposure baked (95°

C. for 1 min). The substrates for the imprinted SU-8 are glass and PET (Sigma-Aldrich) coated with ITO for rigid and flexible samples, respectively. To avoid the glassing temperature of PET, pre- and post-exposure baking temperatures were reduced to 80° C. but baked at doubled times.

Electron Beam Deposition.

The 30 nm Al films are deposited using a Temescal (FC-1800) six-pocket electron beam evaporation system. For smooth quality films, the sample is mounted on a thermal electric cooler (TEC) and brought to minus 20° C. Evaporations are done at pressures of ≈6E10$^{-6}$ Torr and deposition rates of ≈0.1 nm s$^{-1}$. Before deposition, three edges of the sample were masked off. This greatly reduces the chance of a short circuit in the completed LC cell.

LC Cell Formation.

The plasmonic LC cell is fabricated using commercially available twisted nematic LC cells (AWAT PPW, Poland). The commercial cells are heated to 200° C. and then split into two rubbed-polyimide ITO-coated glass slides with 5 μm silica spacers. A single slide is adhered to the plasmonic surface sample using NOA 81 with the polyimide alignment diagonal to the nanostructure grating vector. Once ultraviolet cured, the LC-plasmonic cell is heated to 100° C. and infiltrated with LC (LCM1107). The cell is then allowed to cool down to room temperature. The LC cells are driven with a 1 kHz AC sine wave to reduce ion migration. All reported voltages are root mean square values.

Optical Measurements and Images.

Reflection spectra are collected using a 10, 0.07 NA objective on an optical microscope (Hyperion 1000) coupled to a Fourier transform infrared spectrometer (Vertex 80) and outfitted with a 0.6 mm spatial aperture. Reflection spectra are normalized to an aluminum mirror with 96% reflectivity. Images are collected using the same optical microscope with ×4 and ×10 objectives and an Infinity 2-5 camera. Defects due to laser lithography patterning errors (missing pixels) have been replaced by nearest neighbors in FIGS. 4a-d with the GIMP software package.

Fem Modelling.

The orientation of the LC within and near the nanostructures is numerically simulated using a FEM program created by the LC modelling group at UCL. The program uses a Q-tensor method to minimize the Landau-de Gennes free energy functional for a given structure geometry, LC parameters and external electric field. The method utilizes three elastic constants (bend, splay and twist), fourth-order terms in the bulk free energy and Rapini-Papoular surface potentials. The nanowell surface profile is imported from SEMs and set to have degenerate alignment, while the top rubbed-polyimide alignment layer is homogeneous. LC parameters are taken from company provided, but experimentally verified, product information (see FIG. 6a). The simulation uses adaptive tetrahedral meshing with a density of 0.5 and 0.07 points per nm$^3$ in the bulk LC and near the aluminum surface, respectively.

Fdtd Modelling.

Reflection spectra are calculated using experimental parameters for the printed 2D grating structures, with commercial FDTD software package (Lumerical FDTD, Lumerical Solutions). The profile for the electromagnetic simulations was obtained by fitting an analytical equation to SEMs of the nanostructured surface (FIG. 3b). Through further simulations, it was confirmed that the form of the equation has a small impact on the reflection spectrum but not resonance location, as $\lambda_{res}$ strictly depends on structure periodicity due to the phase-matching requirement of GCSPs. The wavelength-dependent refractive index of aluminum is taken from published reports and the anisotropic parameters of the LC layer are obtained using an effective index model based on the orientation of LC obtained from FEM calculations. Slight variations in the dimensions of the DLW structures, the properties of the constituent materials, and the levels of control (for example, uniformity, surface roughness, and so on) associated with the fabrication are the likely causes of the 10-15% overall discrepancy between experimental observation and FDTD simulation.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As may be used herein and in the appended claims for purposes of the present disclosure, the term 'about' means the amount of the specified quantity plus/minus a fractional amount of or reasonable tolerance thereof that a person skilled in the art would recognize as typical and reasonable for that particular quantity or measurement. Likewise, the term 'substantially' means as close to or similar to the specified term being modified as a person skilled in the art would recognize as typical and reasonable as opposed to being intentionally different by design and implementation.

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A liquid crystal (LC)-plasmonic display device comprising:
   a top electrode;
   a bottom electrode comprising
      a substrate,
      a nanostructured polymer material layer on said substrate, and
      a continuous layer of conductor material on said nanostructured polymer material layer and forming a nanostructured plasmonic metasurface layer on a top surface of said substrate, the continuous layer of conductor material defining a two-dimensional mesh pattern with a plurality of openings therein;
      said continuous layer of conductor material having a plasmon resonance over a visible spectrum;
   a homogeneous rubbed LC-alignment layer adjacent a bottom surface of said top electrode and being rubbed diagonally to a grating vector of the nanostructured plasmonic metasurface layer;
   an LC having a birefringence number that is greater than or equal to 0.2, in contact with said bottom electrode, said LC, while in an OFF-state, having a parallel orientation to the nanostructured plasmonic metasurface layer; and
   a voltage source coupled to said top electrode and said bottom electrode;
   wherein the top electrode and the homogeneous LC-alignment layer are transparent over the visible spectrum;
   wherein said bottom electrode comprises a voltage-tunable-color surface that is optically reflective over the visible spectrum,
   wherein the display device reflects color across the visible spectrum;
   wherein said bottom electrode has
      an x-direction nanostructure in a range from 100 to 500 nanometers,
      a y-direction nanostructure in a range from 100 to 500 nanometers, and
      a z-direction nanostructure in a range from 50 to 200 nanometers.

2. The LC-plasmonic display device of claim 1, wherein the top electrode comprises at least one of indium tin oxide (ITO), silver nano wires, carbon nanotubes, a transparent conducting oxide, and a transparent conducting polymer.

3. The LC-plasmonic display device of claim 1, wherein the LC comprises a positive dielectric anisotropy nematic LC.

4. The LC-plasmonic display device of claim 1, wherein the continuous layer of conductor material comprises aluminum.

5. The LC-plasmonic display device of claim 1, wherein the birefringence number is greater than 0.2 and less than 1.00.

6. The LC-plasmonic display device of claim 1, wherein said bottom electrode has a resonance shift greater than 95 nm.

7. The LC-plasmonic display device of claim 1, wherein the voltage-tunable-color surface has a color-tuning rate less than 1 s.

8. The LC-plasmonic display device of claim 7, wherein the voltage-tunable-color surface has a color-tuning rate less than 90 ms.

9. The LC-plasmonic display device of claim 1, wherein the homogeneous rubbed LC-alignment layer comprises a polyimide.

10. A liquid crystal (LC)-plasmonic cell comprising:
   a top electrode;
   a bottom electrode comprising
      a substrate,
      a nanostructured polymer material layer on said substrate, and
      a continuous layer of conductor material on said nanostructured polymer material layer and forming a nanostructured plasmonic metasurface layer on a top surface of said substrate, said continuous layer of conductor material defining a two-dimensional mesh pattern with a plurality of openings therein;

said continuous layer of conductor material having a plasmon resonance over a visible spectrum;

a homogeneous rubbed LC-alignment layer adjacent a bottom surface of said top electrode and being rubbed diagonally to a grating vector of said nanostructured plasmonic metasurface layer; and an LC having a birefringence number that is greater than or equal to 0.2, in contact with said bottom electrode, said LC, while in an OFF-state, having a parallel orientation to the nanostructured plasmonic metasurface layer;

wherein said top electrode and said homogeneous LC-alignment layer are transparent over the visible spectrum;

wherein said bottom electrode comprises a voltage-tunable-color surface that is optically reflective over the visible spectrum, wherein the LC plasmonic cell reflects color across the visible spectrum.

11. The LC-plasmonic cell of claim 10, wherein the top electrode comprises at least one of indium tin oxide (ITO), silver nano wires, carbon nanotubes, a transparent conducting oxide, and a transparent conducting polymer.

12. The LC-plasmonic cell of claim 10, wherein the LC comprises a positive dielectric anisotropy nematic LC.

13. The LC-plasmonic cell of claim 10, wherein the continuous layer of conductor material comprises aluminum.

14. The LC-plasmonic cell of claim 10, wherein the birefringence number is greater than 0.2 and less than 1.00.

15. The LC-plasmonic cell of claim 10, wherein said bottom electrode has a resonance shift greater than 95 nm.

16. The LC-plasmonic cell of claim 10, wherein the voltage-tunable-color surface has a color-tuning rate less than 1 s.

17. The LC-plasmonic cell of claim 16, wherein the voltage-tunable-color surface has a color-tuning rate less than 90 ms.

18. The LC-plasmonic cell of claim 10, wherein the homogeneous rubbed LC-alignment layer comprises a polyimide.

* * * * *